United States Patent
Sundar et al.

(10) Patent No.: US 8,861,891 B2
(45) Date of Patent: Oct. 14, 2014

(54) HIERARCHICAL ATLAS-BASED SEGMENTATION

(75) Inventors: Hari Sundar, Piscataway, NJ (US); Ali Kamen, Princeton, NJ (US); Thomas Boettger, Heidelberg (DE)

(73) Assignee: Siemens Aktiengesellschaft, Munich (DE)

(*) Notice: Subject to any disclaimer, the term of this patent is extended or adjusted under 35 U.S.C. 154(b) by 155 days.

(21) Appl. No.: 13/033,730

(22) Filed: Feb. 24, 2011

(65) Prior Publication Data

US 2011/0216954 A1 Sep. 8, 2011

Related U.S. Application Data

(60) Provisional application No. 61/310,972, filed on Mar. 5, 2010.

(51) Int. Cl.
- *G06K 9/00* (2006.01)
- *G06K 9/32* (2006.01)
- *G06T 7/00* (2006.01)

(52) U.S. Cl.
CPC ..... *G06T 7/0024* (2013.01); *G06T 2207/20128* (2013.01); *G06T 7/0089* (2013.01); *G06T 7/0081* (2013.01); *G06T 2207/10081* (2013.01); *G06T 2207/20016* (2013.01); *G06T 2207/30016* (2013.01)
USPC .......................................... 382/294; 382/128

(58) Field of Classification Search
CPC ..................... G06T 2207/20128; G06T 3/0075
USPC ......... 382/128–131, 160, 171–173, 180, 294; 128/923–924; 600/407, 408, 410
See application file for complete search history.

(56) References Cited

U.S. PATENT DOCUMENTS

| | | | |
|---|---|---|---|
| 8,160,322 B2* | 4/2012 | Dikmen et al. | 382/128 |
| 8,160,357 B2* | 4/2012 | Akinyemi et al. | 382/173 |
| 2005/0070781 A1* | 3/2005 | Dawant et al. | 600/407 |
| 2005/0259882 A1* | 11/2005 | Dewaele | 382/243 |
| 2008/0101676 A1* | 5/2008 | Zheng et al. | 382/131 |
| 2008/0205716 A1* | 8/2008 | Von Berg et al. | 382/128 |
| 2008/0292164 A1* | 11/2008 | Azar et al. | 382/131 |
| 2011/0268330 A1* | 11/2011 | Piper | 382/131 |
| 2012/0134562 A1* | 5/2012 | Boettger et al. | 382/131 |
| 2012/0281900 A1* | 11/2012 | Rueckert et al. | 382/131 |

OTHER PUBLICATIONS

Jan Ehrhardt, H Handels, T Malina, B Strathmann, W Plötz, S.J Pöppl, Atlas-based segmentation of bone structures to support the virtual planning of hip operations, International Journal of Medical Informatics, vol. 64, Issues 2-3, Dec. 2001, pp. 439-447.*

(Continued)

*Primary Examiner* — Andrae S Allison

(57) ABSTRACT

A method for segmenting an image includes registering an annotated template image to an acquired reference image using only rigid transformations to define a transformation function relating the annotated template image to the acquired reference image. The defined transformation function is refined by registering the annotated template image to the acquired reference image using only affine transformations. The refined transformation function is further refined by registering the annotated template image to the acquired reference image using only multi-affine transformations. The twice refined transformation function is further refined by registering the annotated template image to the acquired reference image using deformation transformations.

15 Claims, 4 Drawing Sheets

(56) References Cited

OTHER PUBLICATIONS

Dinh et al, Interpolation with Sigmoid Functions for Spatial Error Concealment, 2007 IEEE International Symposium on Signal Processing and Information Technology.*

Han et al, Atlas-Based Auto-segmentation of Head and Neck CT Images 435, Medical Image Computing and Computer-Assisted Intervention—MICCAI 2008 Lecture Notes in Computer Science vol. 5242, 2008, pp. 434-441.*

Olivier Commowick, Vincent Grégoire, Graégoire Malandain, Atlas-based delineation of lymph node levels in head and neck computed tomography images, Radiotherapy and Oncology, vol. 87, Issue 2, May 2008, pp. 281-289.*

J. Wu and A. Chung, "A novel framework for segmentation of deep brain structures based on Markov dependence tree," Neuroimage 46, 1027-1036 (2009).*

* cited by examiner

HIERARCHICAL ATLAS-BASED SEGMENTATION

CROSS-REFERENCE TO RELATED APPLICATION

The present application is based on provisional application Ser. No. 61/310,972, filed Mar. 5, 2010, the entire contents of which are herein incorporated by reference.

BACKGROUND OF THE INVENTION

1. Technical Field

The present disclosure relates to segmentation and, more specifically, to hierarchical atlas-based segmentation.

2. Discussion of Related Art

Segmentation relates to the process of dividing a digital image into recognized portions or segments. Segmentation has many applications within the field of computer vision, and in particular, segmentation has proven useful when applied to medical images. For example, segmentation may be used to locate tumors and other pathologies within a computed tomography (CT) study or a magnetic resonance imaging (MRI) scan. However, segmentation may have many other uses such as facial recognition.

There are multiple different approaches for performing image segmentation. One such example is atlas-based segmentation. In atlas-based segmentation, a reference image which is to be segmented is compared to an atlas that is a single representative dataset which includes one or more template images that are fully annotated a-priori by an expert. In comparing the reference image to a template of the atlas, the template is fitted to the reference image as closely as possible and the pre-determined segmentation of the template image is then used as the segmentation for the reference image.

In fitting the template to the reference image, the size, shape and orientation of the template is changed until a difference between the reference image and the template is minimized. As both the reference image and the template image may be three-dimensional and high-resolution, there may be a very large number of degrees of freedom which must be simultaneously adjusted to find the optimal match. Accordingly, it may not be practical to attempt the performance of atlas-based segmentation at the pixel level, which is to say, attempting to match every pixel of the reference image to every pixel of the template image in one shot.

Accordingly, atlas-based segmentation may be performed in successive stages from a low-resolution stage to a high-resolution stage. In this approach, a low-resolution version of the template is first fitted to a low-resolution version of the reference image. Because of the reduced level of structural detail within the low-resolution images, fitting is significantly simplified. Then, the resolution of both the template and reference images are increased and fitting is repeated. However, here, the previous fitting is used as a starting point for the new fitting and as a result, the fitting process is simplified. This process of fitting using successively higher resolution images may be repeated for as many times as is necessary to produce the final high-resolution fitting, and from this final fitting, segmentation is achieved.

While this approach for atlas-bases segmentation may be effective, there is a need for more efficient and more accurate approaches for performing atlas-based segmentation.

SUMMARY

A method for segmenting an image includes registering an annotated template image to an acquired reference image using only rigid transformations to define a transformation function relating the annotated template image to the acquired reference image. The defined transformation function is refined by registering the annotated template image to the acquired reference image using only affine transformations. The refined transformation function is further refined by registering the annotated template image to the acquired reference image using only multi-affine transformations. The twice refined transformation function is further refined by registering the annotated template image to the acquired reference image using deformation transformations.

The method may further include using the three-times-refined transformation function to map the annotations of the template image to the acquired reference image and applying the mapped annotations of the template image to the structure of the acquired transformation function.

Further refining the refined transformation function by registering the annotated template image to the acquired reference image using only rigid, affine, and multi-affine transformations may include refining the transformation function by registering the annotated template image to the acquired reference image using only two points of rotation, further refining the transformation function by registering the annotated template image to the acquired reference image using only three points of rotation, and still further refining the transformation function by registering the annotated template image to the acquired reference image using four or more points of rotation.

The image may be a head and neck CT image. The annotated template image may include annotations defining a plurality of anatomical structures. The multi-affine transformations may be distance weighted. The multi-affine or deformation transformations may be Sigmoid weighted.

The set of rigid transformations may include only displacement transformations and rotation transformations, the set of affine transformations may include the set of rigid transformations and transformations of scale; the set of multi-affine transformations may include the set of affine transformations and transformations involving multiple points of rotation, and the set of deformation transformations may include all possible transformations.

The rigid transformations may utilize a first number of degrees of freedom, the affine transformations may utilize a second number of degrees of freedom greater than the first number, the multi-affine transformations may utilize a third number of degrees of freedom greater than the second number, and the deformation transformations may utilize a fourth number of degrees of freedom greater than the third number.

The transformation function may be defined by maximizing a similarity matrix relating the annotated template image to an acquired reference image. The annotated template image and the acquired reference image may maintain a constant resolution and sharpness throughout the segmentation process.

The method may further include post-processing the reference image using a non-atlas based automatic segmentation technique that uses the registered annotated template image registered to the reference image as an initial segmentation.

A method for segmenting an image includes receiving a reference image. A stored annotated template image is retrieved. A transformation function that maximizes a degree of similarity between the template image and the reference image when applied to the template image is defined. The transformation function is limited to a first number of degrees of freedom. The determined transformation function is first refined to maximize the degree of similarity between the template image and the reference image when applied to the template image, while the transformation function is limited to a second number of degrees of freedom that is larger than the first number of degrees of freedom. The refined transformation function is used to map the annotations of the template image to the received reference image.

The method may additionally include a second refining step wherein prior to using the refined transformation function to map the annotations of the template image to the received reference image, the first-refined transformation function is second refined to maximize the degree of similarity between the template image and the reference image when applied to the template image, while the transformation function is limited to a third number of degrees of freedom that is larger than the second number of degrees of freedom.

The method may additionally include a third refining step wherein prior to using the refined transformation function to map the annotations of the template image to the received reference image, the twice-refined transformation function is third refined to maximize the degree of similarity between the template image and the reference image when applied to the template image, while the transformation function is limited to a fourth number of degrees of freedom that is larger than the third number of degrees of freedom.

Limiting the transformation function to the first number of degrees of freedom may include limiting the transformation function to a sum of only rigid transformations. Limiting the transformation function to the second number of degrees of freedom may include limiting the transformation function to a sum of only affine transformations, wherein affine transformations includes rigid transformation. Limiting the transformation function to the third number of degrees of freedom may include limiting the transformation function to a sum of only multi-affine transformations, wherein multi-affine transformations includes affine transformations. Limiting the transformation function to the fourth number of degrees of freedom comprising limiting the transformation function to a sum of deformation transformations, wherein deformation transformations includes multi-affine transformations.

The method may further include post-processing the reference image using a non-atlas based automatic segmentation technique that uses the reference image with mapped annotations as an initial segmentation.

A computer system includes a processor and a non-transitory, tangible, program storage medium, readable by the computer system, embodying a program of instructions executable by includes registering an annotated template image to an acquired reference image using only rigid transformations to define a transformation function relating the annotated template image to the acquired reference image. The defined transformation function is refined by registering the annotated template image to the acquired reference image using only affine transformations. The refined transformation function is further refined by registering the annotated template image to the acquired reference image using only multi-affine transformations. The twice refined transformation function is further refined by registering the annotated template image to the acquired reference image using deformation transformations. The three-times-refined transformation function is used to segment the acquired reference image by mapping the annotations of the template image to the acquired reference image and applying the mapped annotations of the template image to the structure of the acquired transformation function.

The rigid transformations may utilize a first number of degrees of freedom, the affine transformations may utilize a second number of degrees of freedom greater than the first number, the multi-affine transformations may utilize a third number of degrees of freedom greater than the second number, and the deformation transformations may utilize a fourth number of degrees of freedom greater than the third number.

The method may further include post-processing the reference image using a non-atlas based automatic segmentation technique that uses the segmented reference image as an initial segmentation for the non-atlas based segmentation.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
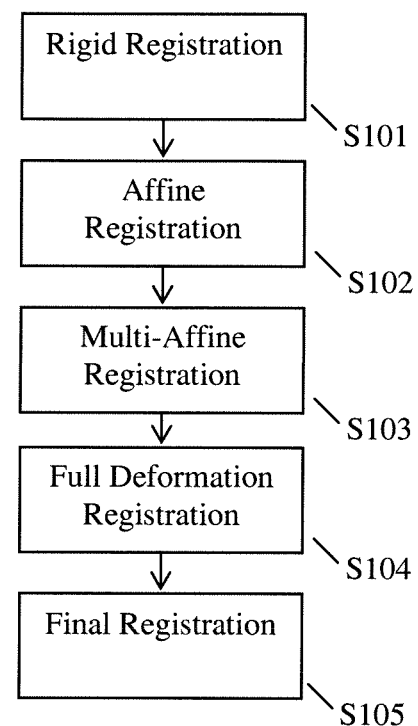
FIG. 1 is a flow chart illustrating an approach for performing hierarchical atlas-based segmentation according to an exemplary embodiment of the present invention in which a reference image is matched with an atlas.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide a highly efficient and effective approach to atlas-based segmentation that utilizes a registration scheme in which, rather than attempting to simultaneously utilize all degrees of freedom in matching the template image to the reference image, the available degrees of freedom are initially limited to a low level and then during successive stages of matching, additional degrees of freedom are introduced. A final fitting may be provided after a high number of degrees of freedom have been introduced. Accordingly, rather than increasing resolution of the template and reference images during successive stages, it is the degrees of freedom available to the fitting that are introduced in a hierarchical fashion.

FIG. 1 is a flow chart illustrating an approach for performing hierarchical atlas-based segmentation according to an exemplary embodiment of the present invention in which a reference image is matched with an atlas. In a first pass, only a rigid registration of the atlas to the reference image is permitted (Step S101). In rigid registration, only rigid transformations are used to fit the template image of the atlas to the reference image to the greatest extent possible. Optimal fit is achieved when a difference between the template image and the reference image are minimized. Here, rigid transformations are used to adjust the position and orientation (rotation) of the template image to minimize a calculated difference between the two images. In this step there are only five degrees of freedom including x-axis translation, y-axis translation, z-axis translation, extent of inclination-angle rotation ($\theta$), and the extent of azimuth-angle rotation ($\phi$).

Then, in a second pass, the registration achieved in the first pass is refined by continuing the matching while allowing for affine registration (Step S102). Affine registration is performed by allowing only affine transformations to be used in fitting the template image to the atlas image. Affine transforms include the set of rigid transforms and additionally include scaling. Accordingly, in the second pass, translation, orientation and scale are adjusted to refine the initial registration. The inclusion of scale adds three additional degrees of freedom, x-axis scale, y-axis scale, and z-axis scale. Accordingly, there may be a total of nine degrees of freedom available at this stage. Alternatively, scaling may be held equal for all three directions in which case scaling would add only a single additional degree of freedom.

Moreover, the two degrees of freedom which are described above as a rotation in a $\theta$ and $\phi$ direction may alternatively be described in terms of rotation in a single solid angle direction ($\Omega$). Accordingly, the manner of counting of the degrees of freedom is less important than the fact that at every subsequent iteration additional degrees of freedom are added and that these added degrees of freedom represent actual degrees of freedom rather than a change in the way degrees of freedom are counted.

Figure 3:
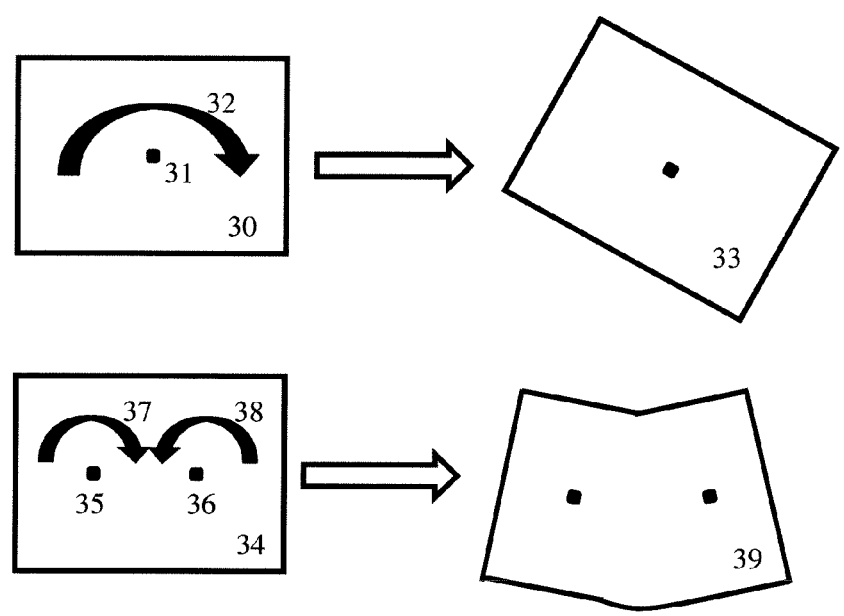
FIG. 3 is a diagram illustrating a difference between a rotation having a single transformation center that would be characterized as a rigid transformation and a rotation having multiple transformation centers that would be characterized as a multi-affine transformation according to an exemplary embodiment of the present invention.

In a third pass, the registration achieved in the second pass is further refined by continuing the matching while additionally allowing for multi-affine registration (Step S103). Multi-affine registration is performed by additionally allowing multi-affine transformations to be used in fitting the template image to the atlas image. The multi-affine transformation is one in which there are multiple points about which the image is rotated simultaneously (multiple transformation centers). FIG. 3 is a diagram illustrating a difference between a rotation having a single transformation center that would be characterized as a rigid transformation (a subset of the affine transformation) and a rotation having multiple transformation centers (e.g. two transformation centers) that would be characterized as a multi-affine transformation.

In FIG. 3, the rotation 32 of shape 30 is performed about a single transformation center 31 to result in the rotated shape 33. Whereas shape 34 has a first transformation center 35 that experiences a first rotation 37 and the shape 34 also has a second transformation center 36 that experiences a second rotation 38. The result of this multi-affine transformation is shape 39. It should be noted that the multi-affine transformation should be kept smooth and continuous by interpolating the points of the image that lie between the multiple transformation centers.

The multi-affine registration step (S103) may itself be divided into multiple registration steps wherein at each successive step, the registration is iterated by allowing for additional transformation centers to be used. For example, a first multi-affine registration step may involve two transformation centers, a second multi-affine registration step may involve three transformation centers, etc. In such a case, the number of the transformation centers could progressively increase as the registration process advances.

In a fourth pass, the registration achieved in the third pass is further refined by continuing the matching while allowing for deformation transformations as well as the affine and multi-affine transformations, which may also be considered to be subsets of deformation transformations (Step S104). Deformation transformations are transformations in which local distortions are permitted, which is to say, the ratio of distances between pixels of the image is not necessarily maintained during the transformation. Examples of deformation transformations that may be applied include shear and spline deformations, although, technically all of the transformations described above represent subsets of this most inclusive grouping of transformations.

In performing deformation transformations, deformation fields (e.g. three-dimensional vectors) may be defined for subgroups of pixels. Assuming that the number of pixels in the patient image is N, the degrees of freedom for such a transformation may be 3N/M, where M represents the number of pixels within the subgroup volume. This step may also be performed as a sequence of iterative steps in which at each iteration, M approaches one. When the subgroups are accordingly defined as a single pixel, transformational degrees of freedom are at maximum.

Alternatively, rather that applying a deformation field exclusively to a particular subgroup volume, the deformation field may be applied over the entire volume according to a weighted approach such as the Sigmoid weighted approach, as discussed in detail below.

The registration achieved as a result of the deformation registration may be used as the final registration (Step S105). The final registration may successfully result in the alignment of the annotated atlas to the reference patient image so that the annotations of the atlas may be imparted to the reference image.

Accordingly, at each successive registration step, the number of degrees of freedom that are available to transform the template image in matching the template image to the reference image may be increased.

It should be noted that at each step, the reference and template images that are matched may remain in their full and high resolution. Accordingly, unlike conventional approaches to atlas-bases registration where registration is successively refined by increasing resolution or sharpness, here resolution and sharpness may remain constant. However, exemplary embodiments of the present invention need not be limited to the use of reference and template images of constant resolution and sharpness. Some exemplary embodiments of the present invention may combine elements of increasing resolution with elements of increasing degrees of freedom available to transformations. For example, registration may be performed initially by sequentially increasing resolution and degrees of freedom at each step, or by increasing resolution at some steps and degrees of freedom at other steps.

It is described above that at each step additional spatial transformations may be applied, however, it may be the case that at each step only a single spatial transformation is determined. This single spatial transformation maps the atlas image onto the patient reference image in such a way as to maximize the similarity between the two images (or to minimize the difference between the two images). However, the single spatial transformation may itself be a combination of multiple different forms of transformations and it should be understood that at each successive registration refinement step, the degrees of freedom with which the spatial transformation is bound within will increase.

As discussed above, the atlas may be a collection of one or more representative data sets (template images) that are annotated. In selecting representative data sets, images that are as "typical" as possible may be used. These data sets may be free of any pathologies and should not demonstrate extreme cases of anatomical shapes and sizes. As the protocol followed in acquiring images may affect the appearance of the images, atlases may be specific to the particular protocol followed within a certain clinic. For example, multiple atlases may be generated using different protocols and a particular atlas may be selected that was generated using the same (or as close as possible) protocol as that which is used to acquire the patient image.

For example, for Head and Neck radiotherapy, a certain clinic might use a special CT protocol for planning radiotherapy. The atlas images used may have been acquired using the same protocol. Once the atlas image is identified, the desirable anatomical structures or regions may be delineated on the atlas. This process of delineation may be performed by an expert clinician with or without computer aided diagnostic devices. An exemplary list of desirable anatomical structures to be identified within the head and neck CT image are provided below in Table 1.

TABLE 1

TABLE OF ORGANS/REGIONS FOR HEAD AND NECK CT

Brain
Brainstem
Spinal cord
Eyes (left, right)
Optic Nerves (left, right)
Eye lens (left, right)
Mandible
Parotids (left, right)
TMJ (Temporo-Mandibular Joint)
Lymph node regions The list of desirable anatomical structures provided above is offered as an example of structures that may be of interest in a head and neck CT and other desirable anatomical structures may be found within the atlas. In fact, all of the anatomical structures that one would want to detect within the patient reference image may first be found within the atlas. However, as exemplary embodiments of the present invention may utilize a preexisting atlas and an atlas once created may be used any number of times in any number of clinics and institutions, in the automatic registration of patient reference images, development of an atlas with a thorough set of anatomical structures identified therein would be beneficial.

After the atlas has been created, exemplary embodiments of the present invention provide for an accurate, robust, and computationally efficient approach to performing atlas-based segmentation using a hierarchical scheme.

As the robustness of registration and the computational complexity of a registration process may be inversely proportional to a degree of freedom (number of parameters subject to change in maximizing similarity) of the deformation model, use of a small number of parameters may create a poor match while use of a large number of parameters may give rise to an impractical computational complexity. Moreover, use of a large number of parameters may create an excessively large dependency upon initialization whereby a large local deformation between atlas and patient images might not be effectively solvable when using a free-form deformation model with voxel-based displacement. Accordingly, the hierarchical structure employed by exemplary embodiments of the present invention reduces computational complexity by incrementally increasing available degrees of freedom as registration progresses. At each iteration, registration is improved and accordingly, by the time registration approaches higher degrees of freedom, the probability of encountering large local deformations may be significantly reduced, as such deformations would be largely handled at prior iterations.

Figure 2:
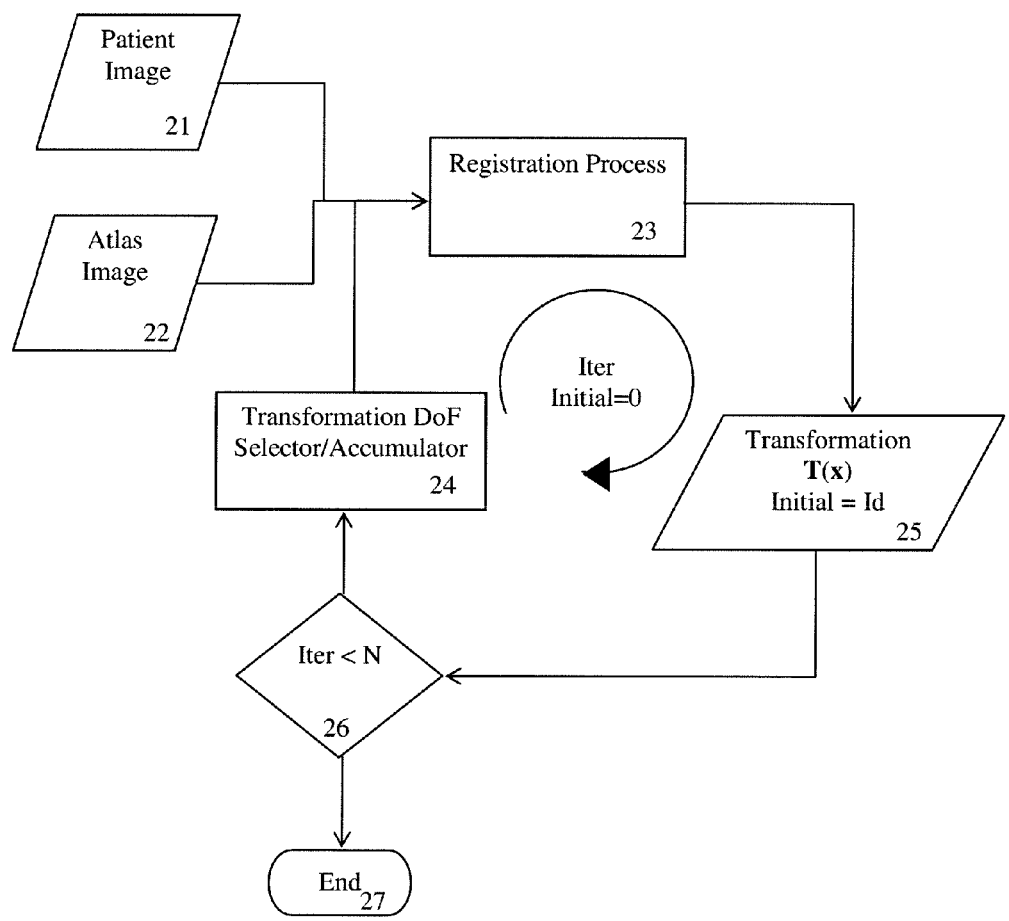
FIG. 2 is a flowchart illustrating a hierarchical scheme for registration according to an exemplary embodiment of the present invention.

FIG. 2 is a flowchart illustrating a hierarchical scheme for registration according to an exemplary embodiment of the present invention. The patient reference image 21 and the annotated atlas image 22 are used as inputs for the registration process 23. The output of the registration process 23 is the complete transformation T(x) 25 that maps the atlas to the coordinate system of the patient image. The registration process may take into account both the previously computed transformation iterations and also the degrees of freedom of the current transformation iteration. Through an iterative loop, the registration process is repeatedly invoked with various degrees of freedom for the sought after incremental correction to the overall transformation T(x). The determination as to how to proceed with additional registration iterations and what degrees of freedom to utilize may be made within the transformation degrees of freedom selector/accumulator 24. However, it may first be determined whether the number of iterations made is less than the predetermined number of iterations permitted "N". When the current number of iterations is less than N (Yes, 26) then another iteration of the registration is performed. When the current number of iterations is not less than N (No, 26) then the process may end 27 and the final transformation may be used as the registration.

As discussed above, exemplary embodiments of the present invention seek to establish a hierarchical scheme for registration in which degrees of freedom of the transformation model that is recovered during the registration process is iteratively increased. In performing registration, transformation may be incorporated into the registration optimization process. In so doing, local transformations centering around various points are combined into a single transformation map which may be iteratively modified and optimized to maximize a similarity matrix. Here, the center of the local transformations may be described as $C_i$ and the corresponding transformation matrix may be described as $T_i$. The overall transformation T(x) may then be computed according to approaches such as the Riemannian Manifold Approach, the Linear Approach, and the Voronoi Decomposition Approach, although other approaches may alternatively be performed.

When using the Weighted Linear Approach, weighing may either be distance-based in which the influence of a given transform decays based on the distance to the transform center. This approach was offered above by way of example. Alternatively, weighing may be Sigmoid Weighted in which the weights decay slowly initially and then have a sharp decay, followed again by a slow decay. Here, the fast-decay distance may correspond with the dominant range of the transform.

When using the Voronoi Decomposition Approach, the image space may be partitioned using Voronoi decomposition based on the transform centers and the effective range of each transform is limited to its Voronoi cell.

Accordingly, the selected decomposition approach may be used to smoothly apply multiple points of rotation and/or multiple deformation fields to a single image.

When analyzing a head and neck CT, exemplary embodiments of the present invention may ensure that the centers of transformation are selected in such a way that they are consistent with the motion articulation of various sections of the anatomy. In this way, computational complexity may be reduced. However, similar constraints may be placed on any imagery by using relevant knowledge of the anatomical structure being imaged to determine where centers of transformation are likely to be found. Weights may then be assigned based on the size of the articulated organ and may decay in locations further from the organ, for example, by using the Sigmoid weighted approach discussed above.

For example, it is known that the neck causes an articulated motion of the head. It therefor may be required that a center of transformation point be placed along the neck. For example, the mandible is known to move in an articulated fashion. Accordingly, another center of transformation may be placed at the interface between the mandible and the maxilla to compensate for possible motion.

After the transformation map has been computed, the map may be used to warp the structures and regions defined in the atlas and bring them onto the patient image. In so doing, warping of the atlas according to the transformation map may include an interpolation step.

An additional step of segmentation refinement may be used, particularly for regions where underlying boundaries are visible in the subject image. This correction step may include the use of standard segmentation algorithms such as active contours, level set methods, graph-based methods, etc. to adjust the contour location to better match the underlying image.

Figure 4:
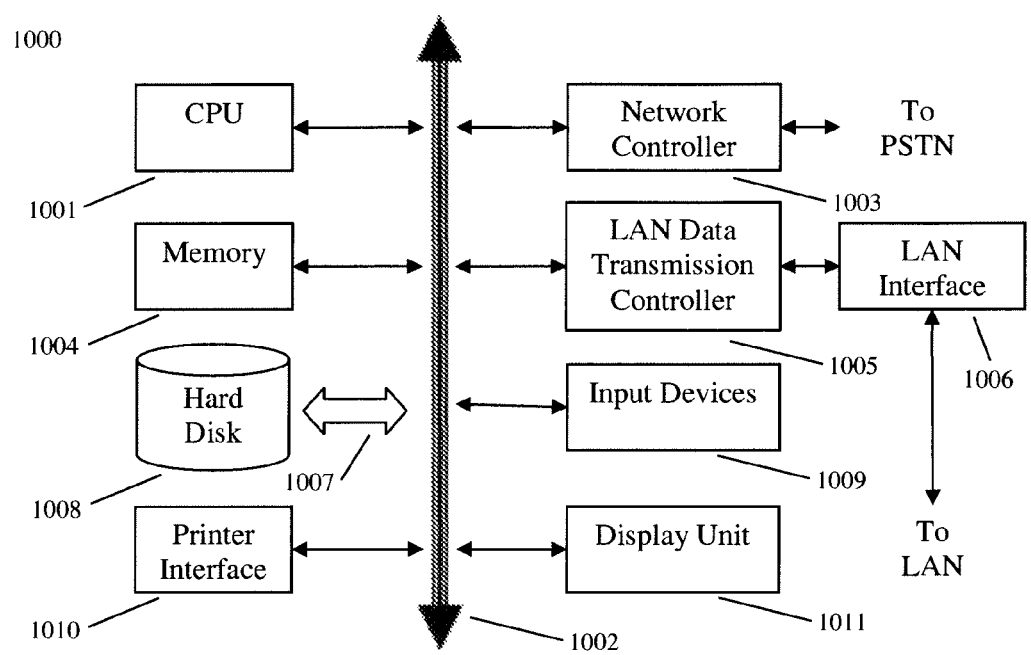
FIG. 4 shows an example of a computer system capable of implementing the method and apparatus according to embodiments of the present disclosure.

The image processing, including the execution of the registration process may be performed using a computer system. FIG. 4 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for segmenting an image, comprising:
registering an annotated template image to an acquired reference image using only rigid transformations to define a transformation function relating the annotated template image to the acquired reference image;
refining the defined transformation function by registering the annotated template image to the acquired reference image using only the rigid transformations and scaling in which scale is held equal for x, y, and z axes;
further refining the refined transformation function by registering the annotated template image to the acquired reference image using only multi-affine transformations, wherein the step of further refining using only multi-affine transformations is divided into multiple registration steps wherein at each successive step thereof, registration is iterated by including additional transformation centers such that a number of transformation centers used during each successive registration step progressively increases; and
still further refining the twice refined transformation function by registering the annotated template image to the acquired reference image using deformation transformations.

2. The method of claim 1, further comprising using the three-times-refined transformation function to map the annotations of the template image to the acquired reference image and apply the mapped annotations of the template image to the structure of the acquired transformation function.

3. The method of claim 1, wherein further refining the refined transformation function by registering the annotated template image to the acquired reference image using only rigid, rigid and scaling, and multi-affine transformations includes:
refining the transformation function by registering the annotated template image to the acquired reference image using only two points of rotation;
refining the transformation function by registering the annotated template image to the acquired reference image using only three points of rotation after the refining using only the two points of rotation; and
refining the transformation function by registering the annotated template image to the acquired reference image using four or more points of rotation after the refining using only the three points of rotation.

4. The method of claim 1, wherein the image is a head and neck CT image.

5. The method of claim 1, wherein the annotated template image includes annotations defining a plurality of anatomical structures.

6. The method of claim 1, wherein the multi-affine transformations are distance weighted.

7. The method of claim 1, wherein the multi-affine or deformation transformations are Sigmoid weighted.

8. The method of claim 1, wherein:
the set of rigid transformations includes only displacement transformations and rotation transformations;
the set of affine transformations includes the set of rigid transformations and a transformation of scale;
the set of multi-affine transformations includes the set of rigid transformations, the transformation of scale, and transformations involving multiple points of rotation; and
the set of deformation transformations includes all possible transformations.

9. The method of claim 1, wherein the rigid transformations utilize a first number of degrees of freedom, the rigid transformations and scaling utilize a second number of degrees of freedom greater than the first number, the multi-affine transformations utilize a third number of degrees of freedom greater than the second number, and the deformation transformations utilize a fourth number of degrees of freedom greater than the third number.

10. The method of claim 1, wherein the transformation function is defined by maximizing a similarity matrix relating the annotated template image to an acquired reference image.

11. The method of claim 1, wherein the annotated template image and the acquired reference image maintain a constant resolution and sharpness throughout the segmentation process.

12. The method of claim 1, further comprising post-processing the reference image using a non-atlas based automatic segmentation technique that uses the registered annotated template image registered to the reference image as an initial segmentation.

13. A computer system comprising:
a processor; and a non-transitory, tangible, program storage medium, readable by the computer system, embodying a program of instructions executable by the processor to perform method steps for segmenting an image, the method comprising:

registering an annotated template image to an acquired reference image using only rigid transformations to define a transformation function relating the annotated template image to the acquired reference image;

refining the defined transformation function by registering the annotated template image to the acquired reference image using only the rigid transformations and scaling in which scale is held equal for x, y, and z axes;

further refining the refined transformation function by registering the annotated template image to the acquired reference image using only multi-affine transformations, wherein the step of further refining using only multi-affine transformations is divided into multiple registration steps wherein at each successive step thereof, registration is iterated by including additional transformation centers such that a number of transformation centers used during the successive registration steps progressively increases;

still further refining the twice refined transformation function by registering the annotated template image to the acquired reference image using deformation transformations; and using the three-times-refined transformation function to segment the acquired reference image by mapping the annotations of the template image to the acquired reference image and applying the mapped annotations of the template image to the structure of the acquired transformation function.

14. The computer system of claim 13, wherein the rigid transformations utilize a first number of degrees of freedom, the rigid and scaling transformations utilize a second number of degrees of freedom greater than the first number, the multi-affine transformations utilize a third number of degrees of freedom greater than the second number, and the deformation transformations utilize a fourth number of degrees of freedom greater than the third number.

15. The computer system of claim 13, the method further comprising post-processing the reference image using a non-atlas based automatic segmentation technique that uses the segmented reference image as an initial segmentation for the non-atlas based segmentation.

* * * * *